(12) United States Patent
Cho et al.

(10) Patent No.: US 10,085,002 B2
(45) Date of Patent: Sep. 25, 2018

(54) RGB-IR SENSOR, AND METHOD AND APPARATUS FOR OBTAINING 3D IMAGE BY USING SAME

(71) Applicant: LG ELECTRONICS INC., Seoul (KR)

(72) Inventors: Ayoung Cho, Seoul (KR); Sunho Yang, Seoul (KR); Yunsup Shin, Seoul (KR); Sungmin Kim, Seoul (KR); Youngman Kwon, Seoul (KR); Yungwoo Jung, Seoul (KR); Seongkeun Ahn, Seoul (KR); Changhwan Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 14/646,641

(22) PCT Filed: Aug. 13, 2013

(86) PCT No.: PCT/KR2013/007285
§ 371 (c)(1),
(2) Date: May 21, 2015

(87) PCT Pub. No.: WO2014/081106
PCT Pub. Date: May 30, 2014

(65) Prior Publication Data
US 2015/0312556 A1    Oct. 29, 2015

Related U.S. Application Data

(60) Provisional application No. 61/729,417, filed on Nov. 23, 2012.

(30) Foreign Application Priority Data

Jul. 30, 2013   (KR) .................. 10-2013-0090155

(51) Int. Cl.
*H04N 13/02*  (2006.01)
*G01S 17/89*  (2006.01)
(Continued)

(52) U.S. Cl.
CPC ..... *H04N 13/0257* (2013.01); *G01B 11/2513* (2013.01); *G01S 17/89* (2013.01);
(Continued)

(58) Field of Classification Search
None
See application file for complete search history.

(56) References Cited

U.S. PATENT DOCUMENTS

2004/0174446 A1* 9/2004 Acharya ................. H04N 5/33
                                                     348/279
2006/0186322 A1* 8/2006 Matsuyama ...... H01L 27/14621
                                                     250/226
(Continued)

FOREIGN PATENT DOCUMENTS

CN      101361373 A    2/2009
CN      102376728 A    3/2012
(Continued)

*Primary Examiner* — Sathyanaraya V Perungavoor
*Assistant Examiner* — Janese Duley
(74) *Attorney, Agent, or Firm* — Birch, Stewart, Kolasch & Birch, LLP (57) ABSTRACT

The present invention relates to an RGB-IR sensor, and a method and an apparatus for obtaining a 3D image by using the same. The RGB-IR sensor according to the present invention comprises: a first pixel basic unit including one of each of R, G, B and IR pixels; and a second pixel basic unit in which the R, G, B and IR pixels are arranged in a different order from those in the first pixel basic unit, wherein the RGB-IR sensor is comprised by alternately arranging the first pixel basic unit and the second pixel basic unit in a horizontal direction, and wherein R, G, B and IR pixel arrangements in the first pixel basic unit and the second pixel (Continued)

→ Tight Coupled
--→ Loose Coupled basic unit are determined so that the position of IR-pixels in the RGB-IR sensor are not equidistance apart from each other.

13 Claims, 7 Drawing Sheets

(51) Int. Cl.
| | |
|---|---|
| *H04N 9/04* | (2006.01) |
| *H04N 5/33* | (2006.01) |
| *H04N 5/376* | (2011.01) |
| *H04N 13/00* | (2018.01) |
| *G01B 11/25* | (2006.01) |
| *H04N 5/235* | (2006.01) |
| *G06T 7/50* | (2017.01) |

(52) U.S. Cl.
CPC ............ *G06T 7/50* (2017.01); *H04N 5/2351* (2013.01); *H04N 5/2352* (2013.01); *H04N 5/33* (2013.01); *H04N 5/3765* (2013.01); *H04N 9/045* (2013.01); *H04N 13/0029* (2013.01); *H04N 13/0037* (2013.01); *H04N 13/0207* (2013.01); *H04N 13/0253* (2013.01); *H04N 13/0296* (2013.01); *H04N 2013/0081* (2013.01)

(56) References Cited

U.S. PATENT DOCUMENTS

| | | | |
|---|---|---|---|
| 2007/0153335 A1* | 7/2007 | Hosaka | ................... H04N 1/58 358/463 |
| 2008/0079828 A1 | 4/2008 | Izawa | |
| 2008/0122933 A1 | 5/2008 | Murayama | |
| 2009/0009621 A1* | 1/2009 | Yamaguchi | .............. H04N 5/33 348/222.1 |
| 2010/0265316 A1 | 10/2010 | Sali et al. | |
| 2010/0289885 A1* | 11/2010 | Lu | ........................ H04N 5/2258 348/61 |
| 2011/0116078 A1 | 5/2011 | Cho et al. | |
| 2011/0155908 A1* | 6/2011 | Song | ...................... G02B 5/201 250/332 |
| 2011/0267340 A1* | 11/2011 | Kraus | .................... A61B 3/102 345/419 |
| 2011/0317005 A1 | 12/2011 | Atkinson | |
| 2012/0038904 A1 | 2/2012 | Fossum et al. | |
| 2012/0105594 A1 | 5/2012 | You et al. | |
| 2012/0182394 A1 | 7/2012 | Bae et al. | |
| 2013/0002823 A1* | 1/2013 | Lim | ........................ G01S 17/89 348/46 |

FOREIGN PATENT DOCUMENTS

| | | |
|---|---|---|
| KR | 10-2012-0015257 A | 2/2012 |
| KR | 10-1108742 B1 | 2/2012 |
| KR | 10-2012-0045462 A | 5/2012 |
| KR | 10-2012-0084216 A | 7/2012 |
| KR | 10-2012-0107755 A | 10/2012 |

\* cited by examiner

→ Tight Coupled
--→ Loose Coupled

RGB-IR SENSOR, AND METHOD AND APPARATUS FOR OBTAINING 3D IMAGE BY USING SAME

CROSS REFERENCE TO RELATED APPLICATIONS

This application is the National Phase of PCT International Application No. PCT/KR2013/007285, filed on Aug. 13, 2013, which claims priority under 35 U.S.C. 119(e) to U.S. Provisional Application No. 61/729,417, filed on Nov. 23, 2012 and under 35 U.S.C. 119(a) to Korean Patent Application No. 10-2013-0090155, filed in the Republic of Korea on Jul. 30, 2013, all of which are hereby expressly incorporated by reference into the present application.

TECHNICAL FIELD

The present invention relates to an RGB-IR sensor, and a method and an apparatus for obtaining a 3D image by using the same.

BACKGROUND ART

Recently, various techniques and products for obtaining a 3D image from a recognized object have been developed. For example, a TOF (Time Of Flight) system is to obtain a 3D image from a distance or depth between a camera and a recognized object, which is measured using a temporal difference between a light emission time for irradiating light to the recognized object and a light receiving time of light reflected from the recognized object. Also, a structure light system is to obtain a 3D image from a depth of a recognized object, which is measured by emitting patterned infrared structured light to the recognized object and analyzing a pattern of infrared rays received from the recognized object.

In this regard, although two or more visible light images may be used to obtain 3D depth information, a system, which uses the visible light images together with infrared ray images as an active light source, has been used recently. Also, in this system, it is general that a separate sensor (RGB sensor) for taking visible light is provided together with an infrared ray sensor (IR sensor). Furthermore, a camera sensor structure for obtaining visible light images and infrared ray images from one RGB-IR sensor by modifying one of sensor pixels for taking visible light to a pixel for obtaining infrared rays has been studied.

Figure 1:
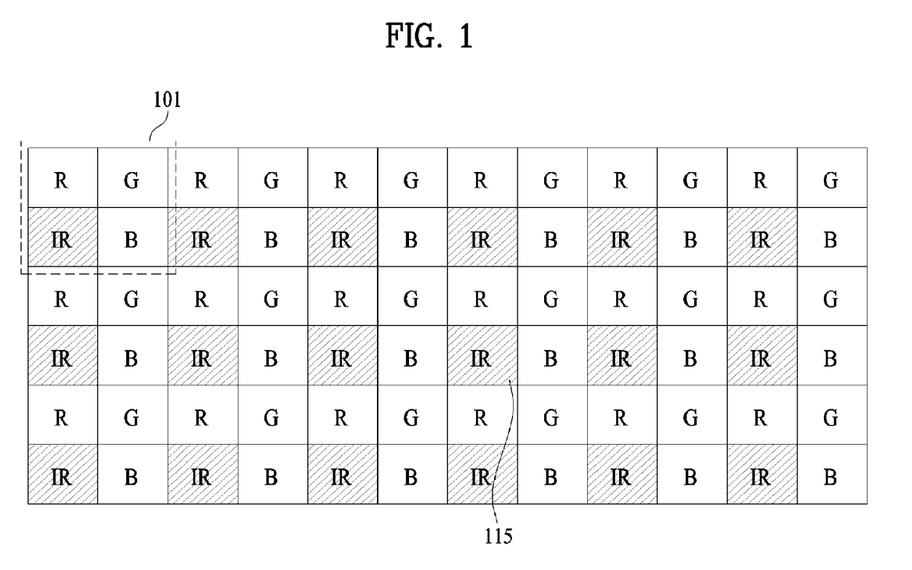
FIG. 1 is a diagram illustrating a pixel arrangement structure of an RGB-IR sensor used for obtaining a 3D image in accordance with the related art.

FIG. 1 is a diagram illustrating a pixel arrangement structure of an RGB-IR sensor used for obtaining a 3D image in accordance with the related art. Generally, the RGB-IR sensor obtains color images of a visible light area through R(Red), G (Green) and B (Blue) pixels and also obtain infrared images through infrared ray (IR) pixels. That is, a single RGB-IR sensor is configured by combination of R, G, B and IR pixel arrangement.

In this regard, FIG. 1 is an example illustrating a pixel arrangement order of an RGB-IR sensor according to the related art. Generally, the RGB-IR sensor structure is configured in such a manner that one G pixel is modified into IR pixel in a general RGB sensor (which is widely known as a 'Bayer sensor structure') that includes one R pixel, one B pixel and two G pixels.

In more detail, it is noted from the pixel arrangement structure of the related art RGB-IR sensor of FIG. 1 that a pixel basic unit structure 101 including R, G, B and IR pixels one by one is repeated at equivalent intervals. Therefore, all IR pixels within the RGB-IR sensor are arranged at equivalent intervals. Likewise, the other color components (R, G and B) are arranged at equivalent intervals. This structure will be referred to as a network or chessboard structure.

Figure 2:
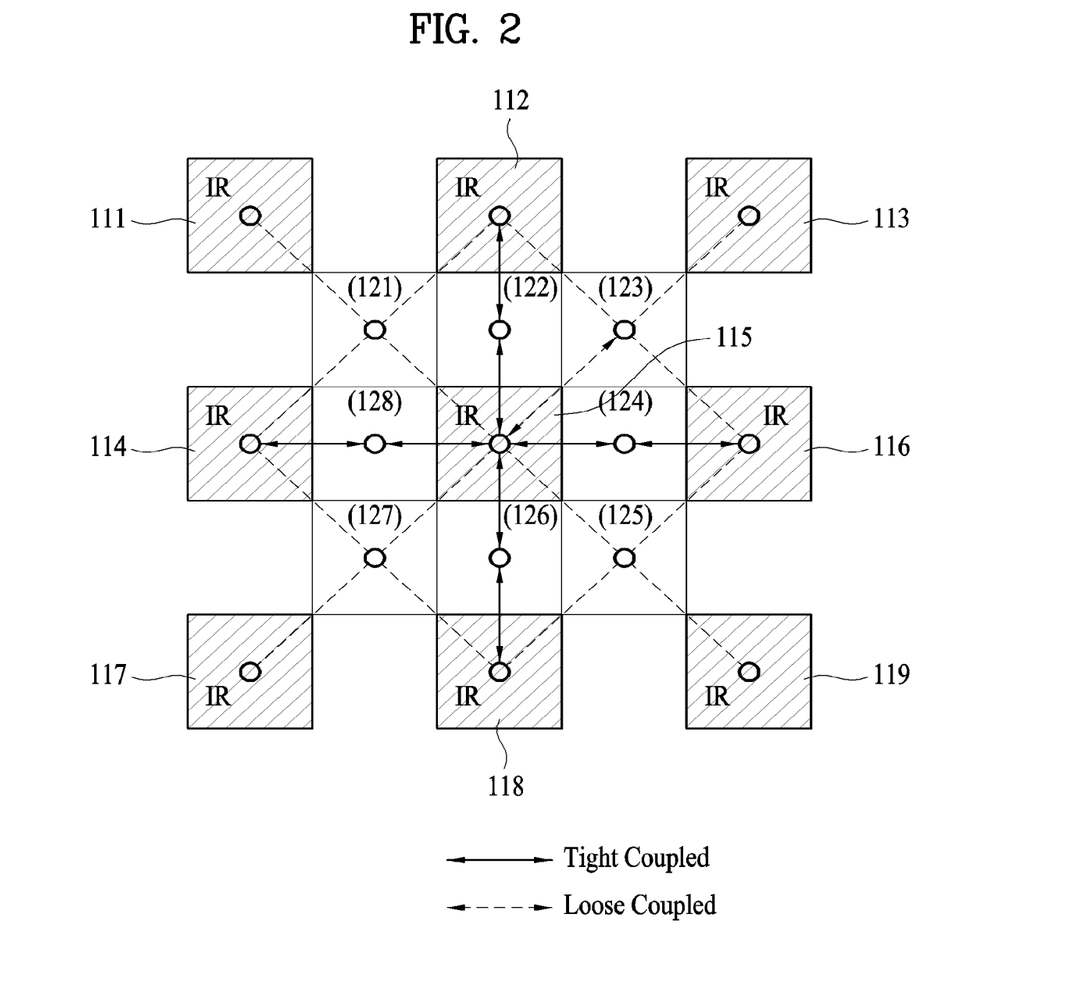
FIG. 2 is a diagram illustrating an interpolation method of IR pixels by using an RGB-IR sensor of FIG. 1 according to the related art.

FIG. 2 is a diagram illustrating an interpolation method of IR pixels by using the related art RGB-IR sensor of FIG. 1. In this regard, FIG. 2 is a reference diagram illustrating how interpolation is performed in a specific pixel location by enlarging neighboring IR pixels 111, 112, 113, 114, 115, 116, 117, 118 and 119 around the IR pixel 115 of FIG. 1.

First of all, a general interpolation method between pixels will be described as follows. In order to obtain RGB color images and IR images, various interpolation methods are generally applied to components obtained by each pixel. For example, a demosaicing method is widely used as the interpolation method. The demosaicing method is a kind of color filter interpolation method, and means an image processing algorithm for recovering a full color value of all pixels in pixel arrangement. For example, various interpolation methods suitable for a corresponding purpose, such as sum of average weighted values and sum of edge based weighted values, are applied to the demosaicing method. Therefore, each pixel may be recovered to have all components (R, G, B, IR) through the demosaicing method.

Referring to FIG. 2 again, for example, a case where IR interpolation is to be performed in pixels 121, 122, 123, 124, 125, 126, 127 and 128, located among IR pixels 111 to 119 will be described. It is noted that two kinds of pixel interpolation methods are applied to FIG. 2. For example, in case of the pixel locations 122, 124, 126 and 128, IR pixels exist near the corresponding pixels, whereby interpolation may be performed using the corresponding IR pixels only. For example, in the pixel location 122, interpolation is performed using two IR pixels 112 and 115. Likewise, in the pixel location 124, interpolation is performed using two IR pixels 116 and 115, in the pixel location 126, interpolation is performed using two IR pixels 118 and 115, and in the pixel location 128, interpolation is performed using two IR pixels 114 and 115. In particular, the IR pixels 112, 114, 115, 116 and 118 adjacent to the interpolation location pixels 122, 124, 126 and 128 are tight coupled with the corresponding interpolation location pixels 122, 124, 126 and 128 are marked with solid lines as shown. The tight coupled IR pixels are characterized in that they are adjacent to a shortest distance from the pixel location where interpolation is to be performed.

On the other hand, in case of the pixel locations 121, 123, 125 and 127, IR pixels do not exist within the shortest distance adjacent to the corresponding pixels, whereby interpolation is performed using four IR pixels surrounding the pixel locations in a diagonal direction. For example, in the pixel location 121, interpolation is performed using four IR pixels 111, 112, 114 and 115. Likewise, in the pixel location 123, interpolation is performed using four IR pixels 112, 113, 115 and 116, in the pixel location 125, interpolation is performed using four IR pixels 115, 116, 118 and 119, and in the pixel location 127, interpolation is performed using four IR pixels 114, 115, 117 and 118.

In this regard, the IR pixels which are not adjacent from the interpolation location within the shortest distance are loose coupled with the corresponding pixel locations 121, 123, 125 and 127 and are marked with dotted lines as shown. That is, in the pixel locations 121, 123, 125 and 127, the tight coupled IR pixels within the shortest distance do not exist. Therefore, if interpolation is performed using the loose coupled IR pixels only, a problem occurs in that interpolation accuracy and efficiency are more deteriorated than the case where at least one or more tight coupled IR pixels exist.

SUMMARY

The present invention has been devised to solve the aforementioned problems, and an object of the present invention is to provide an apparatus and method for efficiently obtaining a 3D image by using an RGB-IR sensor having high interpolation efficiency.

Another object of the present invention is to suggest an arrangement structure that may increase interpolation efficiency in arranging IR pixels of the RGB-IR sensor. In more detail, another object of the present invention is to provide a method for determining arrangement of R, G, B and IR pixels so that IR pixels within the RGB-IR sensor are not arranged at equivalent intervals.

Still another object of the present invention is to provide a structure of an RGB-IR sensor that includes IR pixels.

Further still another object of the present invention is to provide a method for determining arrangement of R, G, B and IR pixels so that at least one or more tight coupled IR pixels exist, from a pixel location where interpolation is to be performed, in arranging IR-pixels of an RGB-IR sensor.

Further still another object of the present invention is to provide a method for efficiently interpolating IR pixels from an RGB-IR sensor arranged in accordance with the present invention.

Further still another object of the present invention is to provide an apparatus for obtaining a 3D image by using an RGB-IR sensor arranged in accordance with the present invention.

Further still another object of the present invention is to provide an apparatus for displaying a 3D image by using an RGB-IR sensor arranged in accordance with the present invention.

To achieve the aforementioned objects, according to one embodiment of the present invention, an RGB-IR sensor comprises a first pixel basic unit including one of each of R, G, B and IR pixels; and a second pixel basic unit of which R, G, B and IR pixels are arranged in a different order from those of the first pixel basic unit, wherein the RGB-IR sensor is comprised by alternately arranging the first pixel basic unit and the second pixel basic unit in a horizontal direction, and R, G, B and IR pixel arrangements in the first pixel basic unit and the second pixel basic unit are determined so that IR-pixels in the RGB-IR sensor are not arranged at equivalent intervals.

Also, the first pixel basic unit is arranged in the pixel order of R→G→B→IR clockwise from a left top, and the second pixel basic unit is arranged in the pixel order of IR→G→B→R clockwise from a left top.

Also, the first pixel basic unit is arranged in the pixel order of R→IR→B→G clockwise from a left top, and the second pixel basic unit is arranged in the pixel order of R→B→IR→G clockwise from a left top.

Also, the IR-pixel structure includes microlenses for receiving light signals; an IR filter located below the microlenses, filtering an infrared signal of the received light signals; and a sensor for sensing the infrared signal that has passed through the IR filter.

Also, the IR-pixel structure further includes an IR pass filter on the microlenses.

Also, the color (R, G and B)-pixel structure includes microlenses for receiving light signals;
color (R, G and B) filters located below the microlenses, filtering a corresponding color (R, G or B) signal of the received light signals; and a sensor for sensing the color (R, G or B) signal that has passed through the color filters.

Also, the color (R, G, and B)-pixel structure further includes an IR cut-off filter on the microlenses.

Also, an apparatus for obtaining a 3D image in accordance with the present invention comprises a light transmitting unit for emitting infrared ray (IR) structured light to a recognized object; a light receiving unit comprising an RGB-IR sensor for receiving infrared rays and visible light reflected from the recognized object; and a processor for obtaining 3D image information including depth information and a visible light image of the recognized object by using each of the infrared rays and the visible light, which are received by the light receiving unit, wherein the RGB-IR sensor includes a first pixel basic unit including one of each of R, G, B and IR pixels and a second pixel basic unit of which R, G, B and IR pixels are arranged in a different order from those of the first pixel basic unit, the RGB-IR sensor is comprised by alternately arranging the first pixel basic unit and the second pixel basic unit in a horizontal direction, and R, G, B and IR pixel arrangements in the first pixel basic unit and the second pixel basic unit are determined so that IR-pixels in the RGB-IR sensor are not arranged at equivalent intervals.

Also, the apparatus further comprises a 3D image recovery unit for recovering the 3D image of the recognized object by using 3D image information obtained from the processor; and a display unit for providing the received 3D image on a visual screen.

Also, the processor uses IR pixels adjacent to a location where interpolation is to be performed and gives a high weighted value to the IR pixel adjacent to the location within a shortest distance, in performing IR signal interpolation by using infrared rays received from the IR pixels.

Also, the IR pixel adjacent to the location within the shortest distance is the IR pixel located at any one of left, right, up and down portions of the location where interpolation is to be performed.

Also, if two neighboring IR pixels exist within the shortest distance, the processor gives the same weighted value to the corresponding neighboring IR pixels, in performing the IR signal interpolation.

Also, the processor uses IR pixels adjacent to a location where interpolation is to be performed and determines the number of IR pixels used for interpolation depending on the number of IR pixels within the shortest distance, which are adjacent to the location where interpolation is to be performed, in performing IR signal interpolation by using infrared rays received from the IR pixels.

Also, if one IR pixel within the shortest distance, which is adjacent to a location where interpolation is to be performed, exists, the processor further uses two IR pixels located in a diagonal direction as well as the IR pixel within the shortest distance, in performing the IR signal interpolation.

Also, the processor gives a higher weighted value to the IR pixel within the shortest distance than the two IR pixels located in a diagonal direction, in performing the IR signal interpolation.

Also, if two IR pixels, which are adjacent to a location where interpolation is to be performed, exist within the shortest distance, the processor uses the two IR pixels only for the IR signal interpolation, in performing the IR signal interpolation.

Also, the processor gives the same weighted value to the two IR pixels in performing the IR signal interpolation.

The other objects, features and advantages of the present invention will be apparent through the detailed description of the embodiments described with reference to the accompanying drawings.

Visible light images and infrared images, which are suitable for their purposes, may be obtained through an RGB-IR sensor structure and an arrangement structure of R, G, B and IR pixels according to the present invention.

Particularly, infrared images may be recovered efficiently through an arrangement structure of IR pixels within an RGB-IR sensor according to the present invention. Also, accurate depth information of a recognized object may be obtained using the recovered infrared images.

Furthermore, clearer and accurate 3D image signals may be displayed through an apparatus for obtaining a 3D image.

DETAILED DESCRIPTION OF THE EMBODIMENT

Hereinafter, the preferred embodiments of the present invention through which the aforementioned objects may be carried out in detail will be described with reference to the accompanying drawings.

Although the terms used in the present invention are selected from generally known and used terms considering their functions in the present invention, it will be apparent that the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein. In more detail, although the terms such as "first" and/or "second" in the present invention may be used to describe various elements, it is to be understood that the elements are not limited by such terms. Also, the terms may be used to identify one element from another element. For example, a first element may be referred to as a second element or vice versa within the range that does not depart from the scope according to a concept of the present specification.

Also, specific structural or functional descriptions of the embodiments according to the concept of the present invention, which are disclosed in this specification, are exemplarily intended to describe the embodiments according to the concept of the present invention. Various modifications may be made in the embodiments according to the concept of the present invention, and the embodiments are therefore to be construed in all aspects as illustrative and not restrictive. Therefore, it is to be understood that the disclosure in this specification includes all modifications, equivalents or replacements included in the spirits and technical range of the present invention.

Figure 3:
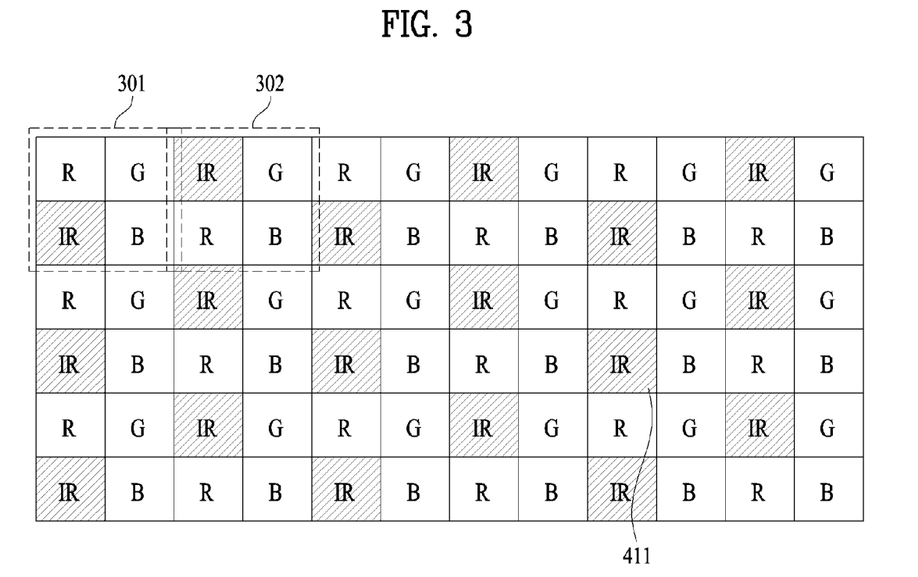
FIG. 3 is a diagram illustrating an example of a pixel arrangement structure of an RGB-IR sensor used for obtaining a 3D image in accordance with the embodiment of the present invention.
Figure 4:
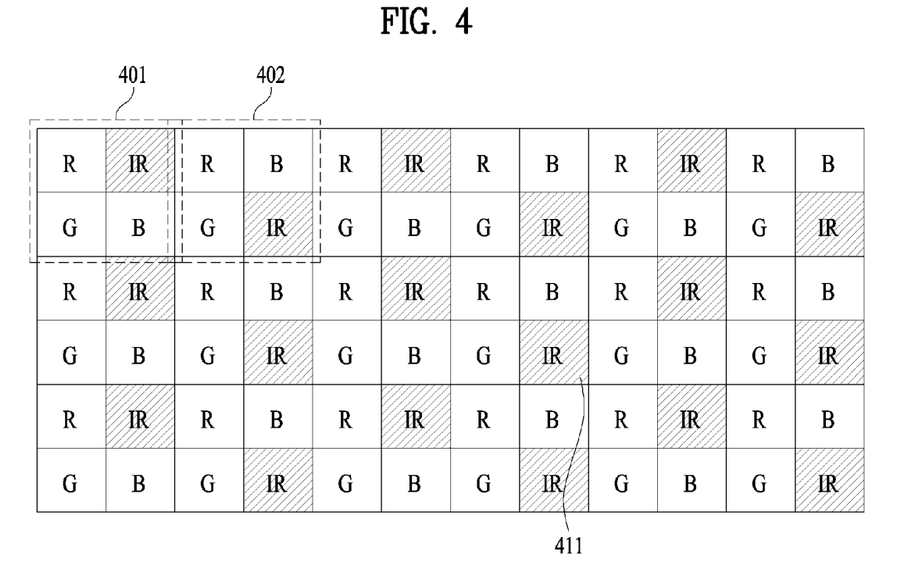
FIG. 4 is a diagram illustrating another example of a pixel arrangement structure of an RGB-IR sensor used for obtaining a 3D image in accordance with the embodiment of the present invention.

Hereinafter, various pixel arrangement structures constituting an RGB-IR single sensor according to the embodiment of the present invention will be described as follows. FIGS. 3 and 4 are diagrams illustrating examples of a pixel arrangement structure of an RGB-IR sensor used for obtaining a 3D image in accordance with the embodiment of the present invention.

In the embodiment of the present invention of FIGS. 3 and 4, at least two or more pixel basic units, for example, first pixel basic units 301 and 401 and second pixel basic units 302 and 402 are provided, and arrangement of R, G, B and IR pixels within the first pixel basic units 301 and 401 and the second pixel basic units 302 and 402 is determined so that IR pixels within the RGB-IR sensor are not arranged at equivalent intervals.

In more detail, in FIG. 3, as one embodiment of the present invention, the first pixel basic unit 301 has a pixel order in the order of R→G→B→IR clockwise from a left top, whereas the second pixel basic unit 302 has a pixel order in the order of IR→G→B→R clockwise from a left top. Therefore, the RGB-IR sensor of FIG. 3 has a structure that the first pixel basic unit 301 and the second pixel basic unit 302 are repeatedly arranged in a horizontal direction. In this regard, it is noted from the final RGB-IR sensor pixel arrangement of FIG. 3 that spacing of neighboring IR pixels in a specific IR pixel is differently applied. As a result, at least one or more neighboring IR pixels which are always tight-coupled in location exist in a pixel location where interpolation to be performed, whereby it is advantageous in that accuracy of interpolation information may be increased. This will be described later with reference to FIG. 5.

Also, in FIG. 4, as another embodiment of the present invention, the first pixel basic unit 401 has a pixel order in the order of R→IR→B→G clockwise from a left top, whereas the second pixel basic unit 402 has a pixel order in the order of R→B→IR→G clockwise from a left top. Therefore, the RGB-IR sensor of FIG. 4 has a structure that the first pixel basic unit 401 and the second pixel basic unit 402 are repeatedly arranged in a horizontal direction. In this regard, it is noted from the final RGB-IR sensor pixel arrangement of FIG. 4 that spacing of neighboring IR pixels in a specific pixel is differently applied in the same manner as FIG. 3. As a result, at least one or more neighboring IR pixels which are always tight-coupled in location exist in a pixel location where interpolation to be performed, whereby it is advantageous in that accuracy of interpolation information may be increased. This will be described with reference to FIG. 5.

Figure 5:
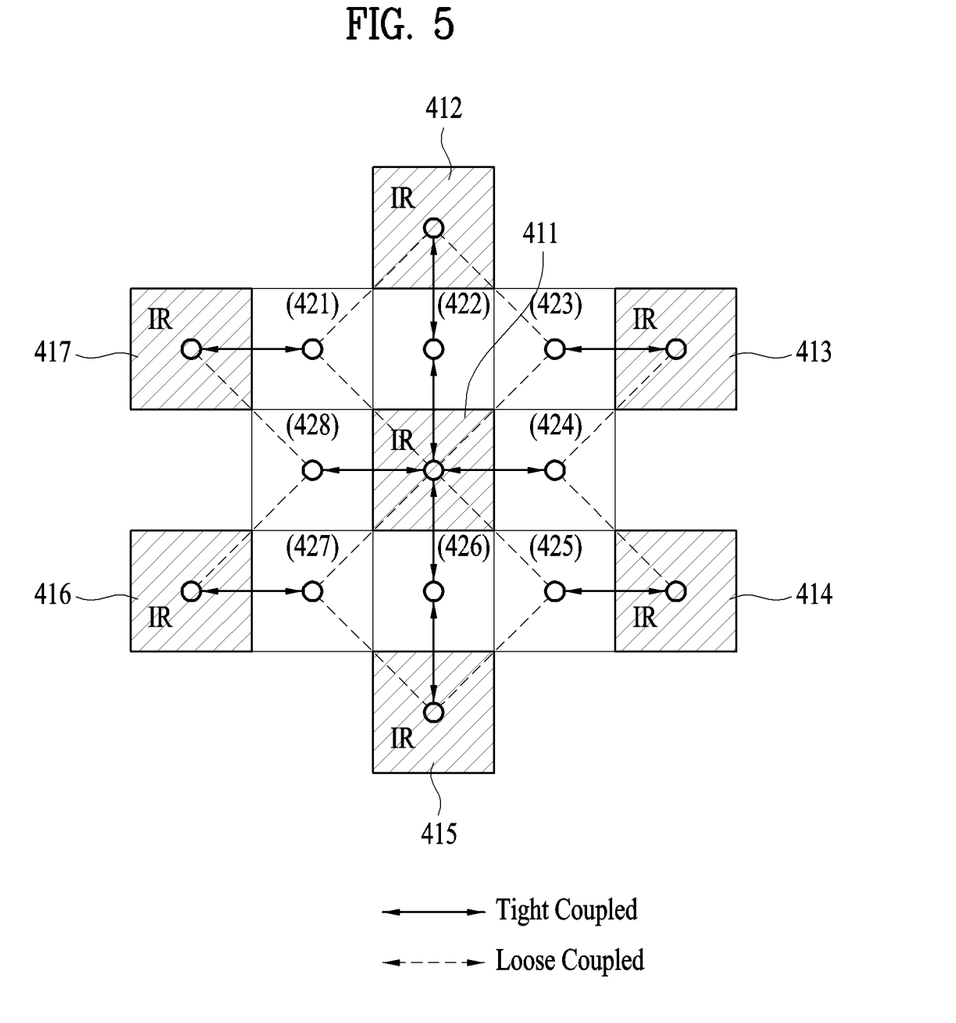
FIG. 5 is a diagram illustrating an interpolation method of IR pixels by using an RGB-IR sensor according to the embodiment of the present invention.

FIG. 5 is a diagram illustrating an interpolation method of IR pixels by using an RGB-IR sensor according to the embodiment of the present invention. In particular, FIG. 5 illustrates an interpolation method of IR pixels by using the RGB-IR sensor of FIGS. 3 and 4. In this regard, FIG. 5 illustrates neighboring IR pixels 412, 413, 414, 415, 416 and 417 around IR pixel 411 of FIGS. 3 and 4 through enlargement, and is a reference diagram illustrating how infrared interpolation is performed in specific pixel locations 421, 422, 423, 424, 425, 426, 427 and 428 located among the above neighboring IR pixels.

For example, in case of the pixel locations 422 and 426, IR pixels (412, 411) and (411, 415) which are tight coupled exist near the corresponding pixels, whereby interpolation may be performed using the corresponding IR pixels only. For example, in the pixel location 422, interpolation is performed using two IR pixels 412 and 411. Likewise, in the pixel location 426, interpolation is performed using two IR pixels 411 and 415. That is, in the pixel locations 422 and 426, the IR pixels (412, 411) and (411, 415) which are tight coupled exist within their adjacent shortest distance, whereby there is no problem in obtain interpolation accuracy. Therefore, when interpolation is actually performed, in case of the pixel location 422, for example, the same weighted value is given to the neighboring IR pixels 411 and 412 which are tight coupled, whereby interpolation may be performed by an average value of the corresponding pixels 411 and 412. Therefore, if at least two or more neighboring IR pixels which are tight coupled exist in the location where interpolation is to be performed, interpolation may sufficiently be performed only by the corresponding IR pixels which are tight coupled, whereby it is not required to consider neighboring IR pixels which are loose coupled, to perform interpolation.

On the other hand, in case of the pixel locations 421, 423, 424, 425, 427 and 428, only one neighboring IR pixel which is tight coupled with the corresponding pixels exists, whereby interpolation is performed additionally considering neighboring IR pixels which are loose coupled.

For example, in case of the pixel location 421, interpolation is performed from one IR pixel 417 which is tight coupled with the corresponding pixel and two IR pixels 412 and 411 which exist in a diagonal direction and are loose coupled with the corresponding pixel. Therefore, when interpolation is actually performed, a higher weighted value is given to the IR pixel 417 which exists within the shortest distance and is tight coupled with the corresponding pixel than two IR pixels 412 and 411 which are loose coupled with the corresponding pixel, whereby interpolation accuracy may be increased.

Also, in case of the pixel location 423, interpolation is performed from one IR pixel 413 which is tight coupled with the corresponding pixel and two IR pixels 412 and 411 which exist in a diagonal direction and are loose coupled with the corresponding pixel. Also, in case of the pixel location 424, interpolation is performed from one IR pixel 411 which is tight coupled with the corresponding pixel and two IR pixels 413 and 414 which exist in a diagonal direction and are loose coupled with the corresponding pixel. Also, in case of the pixel location 425, interpolation is performed from one IR pixel 414 which is tight coupled with the corresponding pixel and two IR pixels 411 and 415 which exist in a diagonal direction and are loose coupled with the corresponding pixel. Also, in case of the pixel location 427, interpolation is performed from one IR pixel 416 which is tight coupled with the corresponding pixel and two IR pixels 411 and 415 which exist in a diagonal direction and are loose coupled with the corresponding pixel. Finally, in case of the pixel location 428, interpolation is performed from one IR pixel 411 which is tight coupled with the corresponding pixel and two IR pixels 417 and 416 which exist in a diagonal direction and are loose coupled with the corresponding pixel.

That is, according to the RGB-IR sensor pixel arrangement structure of the present invention, since one or more IR pixels which are tight coupled exist at any location, the one or more IR pixels may be used for interpolation regardless of the location where interpolation is performed.

In this regard, according to the RGB-IR sensor arrangement of FIGS. 3 and 4, R, G, B and IR pixels may be arranged based on components (for example, IR components) required for priority recovery in accordance with selection of a designer. That is, all the channel components R, G, B and IR have different intervals. For example, it is noted that IR-components and R-components are arranged at different intervals in the pixel arrangement structure of FIG. 3, whereas G-components and B-components are arranged at equivalent intervals in the same manner as FIG. 1 of the related art. That is, this case may be regarded that the designer determines that interpolation is required for IR-component and R-components in priority.

On the other hand, it is noted that IR-components and B-components are arranged at different intervals in the pixel arrangement structure of FIG. 4, whereas R-components and G-components are arranged at equivalent intervals in the same manner as FIG. 1 of the related art. That is, this case may be regarded that the designer determines that interpolation is required for IR-component and B-components in priority. As a result, it is noted that various RGB-IR pixel arrangements which are similar to one another and modified may be made depending on what components for priority recovery are when the designer designs the sensor pixel arrangement.

Figure 6:
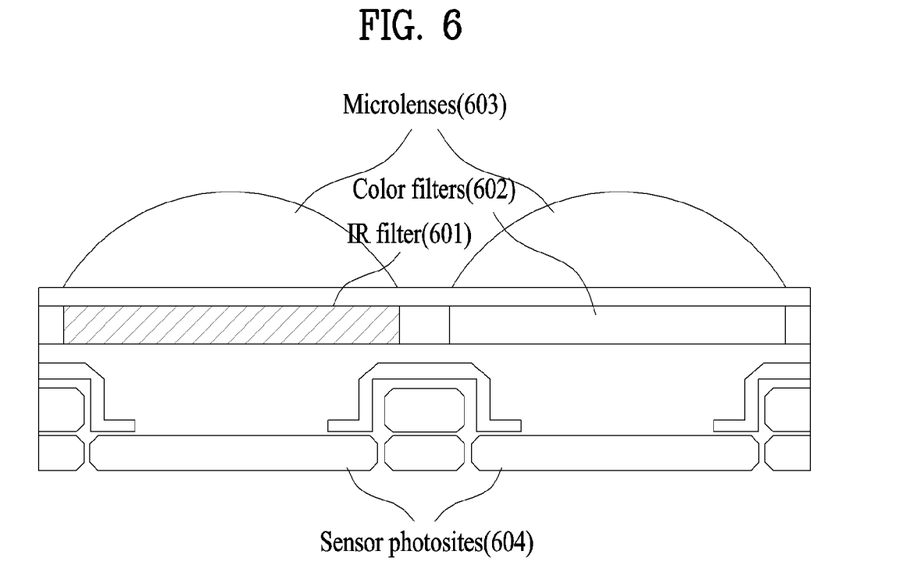
FIG. 6 is a diagram illustrating an example of an RGB-IR sensor structure according to the embodiment of the present invention.
Figure 7:
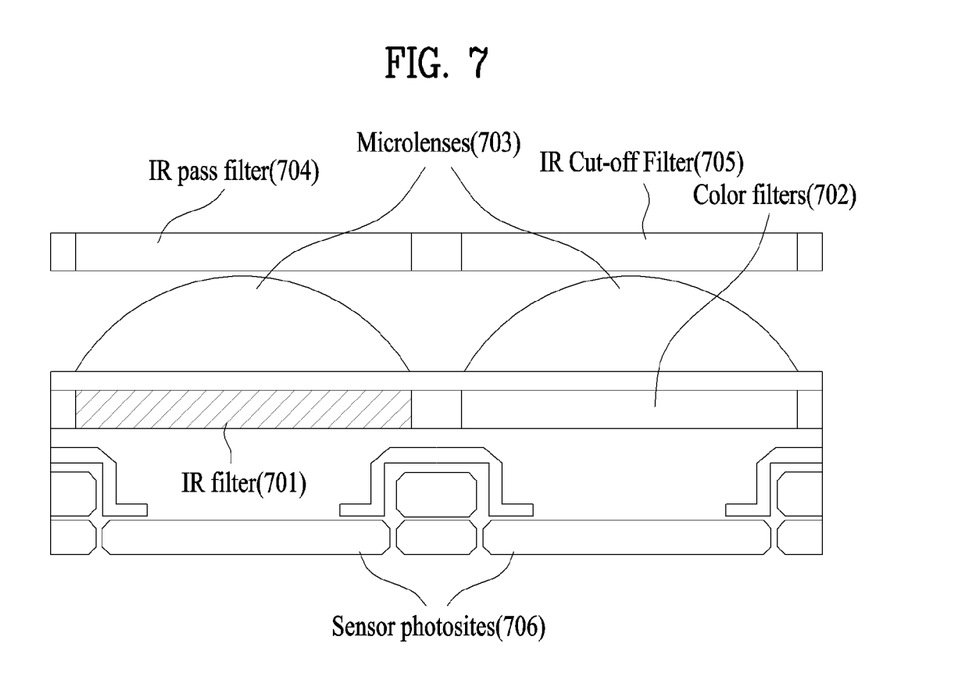
FIG. 7 is a diagram illustrating another example of an RGB-IR sensor structure according to the embodiment of the present invention.

FIGS. 6 and 7 are diagrams illustrating examples of an RGB-IR sensor structure according to the embodiment of the present invention. That is, the RGB-IR sensor according to the present invention is configured by integrating RGB color sensor with IR sensor to configure a visible light color image and an infrared image as a view on the same axis, whereby it is advantageous in that more accurate 3D image may be configured.

In this regard, FIG. 6 is a diagram illustrating one section of an RGB-IR sensor structure according to the embodiment of the present invention. Referring to FIG. 6, one G (green) filter of color filters 602 configured by an existing Bayer pattern is replaced with an IR filter 601. Also, microlenses 603 for receiving light are located on the color filters 602 and the IR filter 601. Also, a sensor 604 for sensing a signal, which has passed through the color filters 602 and the IR filter 601, is provided below the color filters 602 and the IR filter 601.

Also, FIG. 7 is a diagram illustrating another section of an RGB-IR sensor structure according to the embodiment of the present invention. Referring to FIG. 7, one G (green) filter of color filters 702 configured by an existing Bayer pattern is replaced with an IR filter 701. Also, microlenses 703 for receiving light are located on the color filters 702 and the IR filter 701. Also, a sensor 704 for sensing a signal, which has passed through the color filters 702 and the IR filter 701, is provided below the color filters 702 and the IR filter 701. Moreover, an IR pass filter 704 is further provided on the IR filter 701 to condense IR components. On the other hand, an IR cut-off filter 705 is further provided on the color filters 702 to cut off condensing of IR-components. Preferably, the IR pass filter 704 and the IR cut-off filter 705 are located on the microlenses 703.

Figure 8:
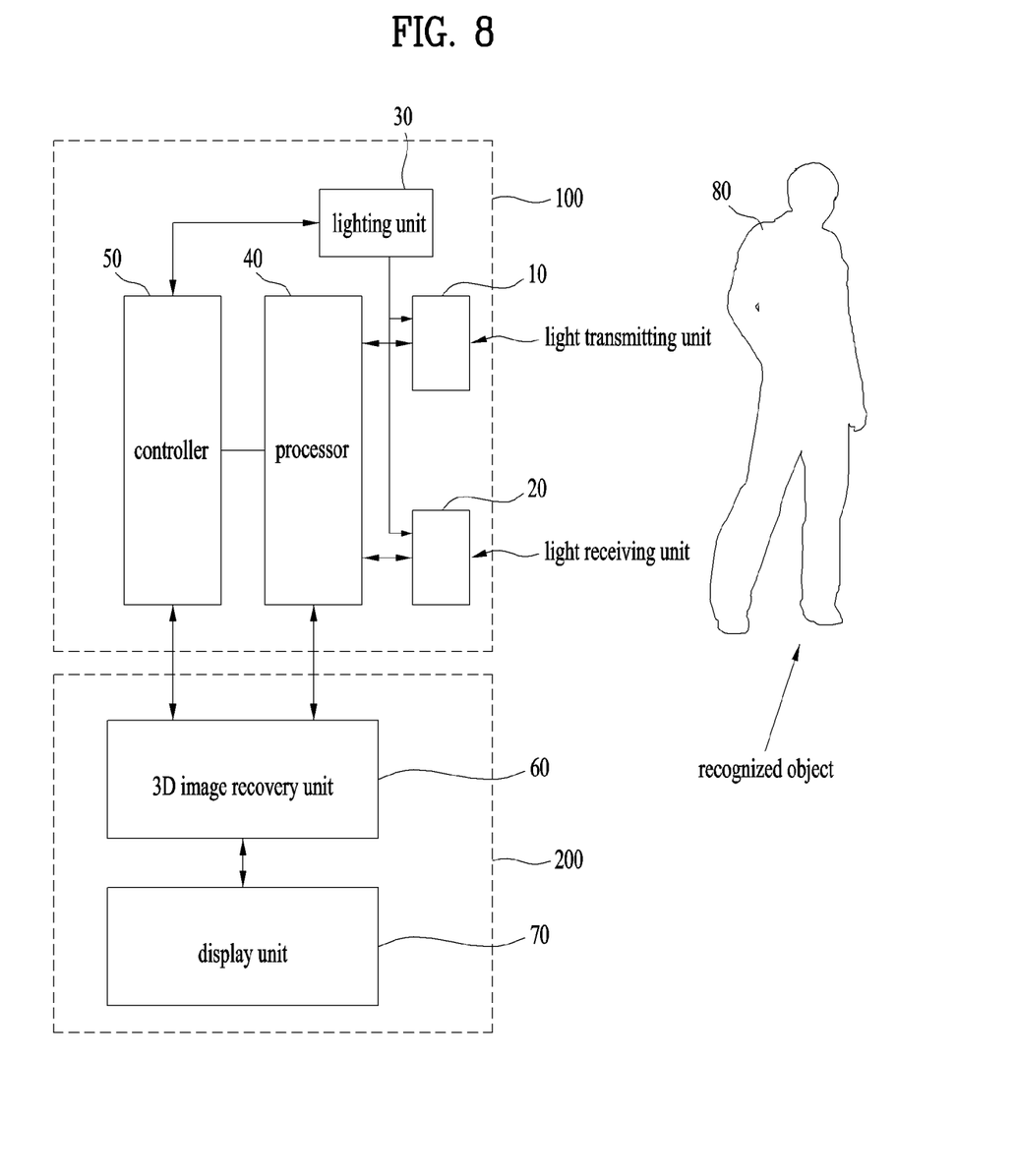
FIG. 8 is a diagram illustrating an apparatus for obtaining a 3D image by using an RGB-IR sensor according to the embodiment of the present invention.

FIG. 8 is a diagram illustrating an apparatus for obtaining a 3D image in accordance with the embodiment of the present invention. Referring to FIG. 8, a reference numeral 100 depicts an apparatus for obtaining a 3D image in a narrow sense, and a reference numeral 200 depicts a display apparatus for displaying a 3D image by receiving the 3D image from the apparatus for obtaining a 3D image and recovering the 3D image to an original image. In a broad sense, the apparatus for obtaining a 3D image means the display apparatus 200.

Figure 9:
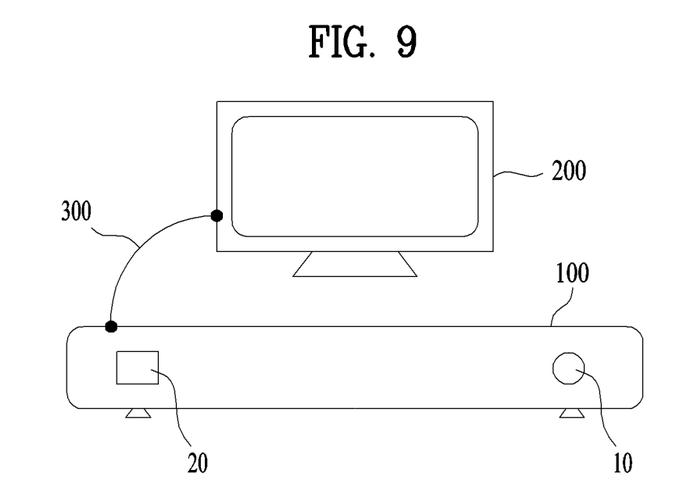
FIG. 9 is an exemplary diagram illustrating that an apparatus 100 for obtaining a 3D image and a display apparatus 200 are separated from each other in accordance with the embodiment of the present invention.

In FIG. 8, the apparatus 100 for obtaining a 3D image in accordance with the embodiment of the present invention may include a light transmitting unit 10, a light receiving unit 20, a processor 40, a lighting unit 30, and a controller 50 for controlling the above units. Also, the display apparatus 200 includes a 3D image recovery unit 60 for receiving 3D image related information (for example, color image information, depth information, etc.) from the apparatus 100 for obtaining a 3D image and recovering the 3D image related information, and a display unit 70 for visually providing the recovered image. Also, the display apparatus 200 may control the 3D image recovery unit 60 and the display unit 70 through the controller 50 within the apparatus 100 for obtaining a 3D image as shown in FIG. 8. On the other hand, although not shown, it will be apparent that a separate controller (not shown) may be provided if the apparatus 100 for obtaining a 3D image and the display apparatus 200 are provided separately from each other as shown in FIG. 9.

The light transmitting unit 10 emits infrared rays (IR) to a recognized object 80 to obtain 3D depth information of the recognized object 80. For example, for application of the structured light system, the infrared rays may include a specific pattern. In this case, the light transmitting unit 10 may be a structured light unit for emitting infrared structured light.

Also, the light receiving unit 20 includes a sensor for receiving infrared rays and visible light reflected from the recognized object. Also, in the present invention, it is characterized in that the light receiving unit 20 includes an RGB-IR single sensor that may obtain infrared rays and visible light on the same axis and at the same space. In this respect, an example of a pixel arrangement structure of the RGB-IR single sensor constituting the light receiving unit 20 is the same as that described in detail with reference to FIGS. 3 to 7.

Also, the processor 40 obtains depth information of the recognized object by using the infrared rays received by the light receiving unit 20, and generates color image information by using the visible light received by the light receiving unit 20. The depth information and the color image information, which are obtained by the processor 40, will be referred to as 3D image information of the recognized object. Also, the 3D image information obtained by the processor 40 is provided to the image recovery unit 60 and used for 3D image recovery. That is, the image recovery unit 60 recovers the 3D image by applying the depth information to the color image information. Also, the display apparatus 200 includes a display unit 70 for providing the recovered 3D image to a visual screen.

In this regard, the processor 40 may be an element for performing IR-pixel interpolation of the RGB-IR sensor as mentioned in FIGS. 3 to 5, and includes characterized operations as follows. For example, the processor 40 uses IR pixels adjacent to a location where interpolation is to be performed, in performing IR signal interpolation by using infrared rays received by the IR pixels, wherein a high weighted value is given to the neighboring IR pixels within the shortest distance. Also, if two neighboring IR pixels exist within the shortest distance, the processor 40 gives the same weighted value to the corresponding neighboring IR pixels in performing IR signal interpolation. Also, the processor 40 uses IR pixels adjacent to a location where interpolation is to be performed, in performing IR signal interpolation by using infrared rays received by the IR pixels, wherein the number of IR pixels used for interpolation is determined depending on the number of IR pixels within the shortest distance, which are adjacent to the location where interpolation is to be performed. For example, if one IR pixel within the shortest distance, which is adjacent to the location where interpolation is to be performed, exists, the processor 40 further uses two IR pixels located in a diagonal direction as well as the IR pixel within the shortest distance, which is adjacent to the location where interpolation is to be performed, wherein a higher weighted value is given to the IR pixel within the shortest distance than the two IR pixels located in a diagonal direction. On the other hand, if two IR pixels within the shortest distance, which are adjacent to the location where interpolation is to be performed, exist, the processor 40 uses only the two IR pixels within the shortest distance for interpolation, wherein the same weighted value is given to the two IR pixels within the shortest distance.

Also, the lighting unit 30 is characterized to control an infrared lighting period under the control of the controller 50 to prevent interference of the infrared rays and the visible light within the light transmitting unit 10 from occurring. In particular, the present invention is also characterized in that the lighting unit 30 considers brightness of ambient light in controlling the infrared lighting period. In this regard, as a method for controlling a lighting period of the controller 50 and the lighting unit 30, a visible light measurement time period and an infrared measurement time period are separated from each other, whereby interference between the infrared rays and the visible light may be avoided. Also, in case of a low light level (for example, night and dark space), it is possible to adaptively respond to the ambient light as well as interference by allowing a time period for taking visible light to be longer than a time period for taking infrared rays. Also, in FIG. 8, for convenience of description, the lighting unit 30 and the light transmitting unit 10 are separated from each other. However, the description of FIG. 8 is only exemplary. Therefore, in actual application of the product, the lighting unit 30 may include lenses serving as lighting sources in the light transmitting unit 10, and may be provided as a part integrated with the light transmitting unit 10.

In this regard, FIG. 9 is an exemplary diagram illustrating that an apparatus 100 for obtaining a 3D image and a display apparatus 200 are separated from each other in accordance with the embodiment of the present invention. As shown in FIG. 9, if the two apparatuses 100 and 200 are separated from each other, the 3D related information obtained from the processor 40 within the apparatus 100 for obtaining a 3D image may be transferred to the image recovery unit 60 within the display apparatus 200 through a signal connection line 300. Also, the signal connection line 300 may be provided as a wire or wireless line. For example, although the signal connection line 300 may have a physical shape such as a cable line, the signal connection line 300 may be provided as a wireless network (for example, Bluetooth, NFC, WiFi, etc.). If the wireless network is used as the signal connection line 300, it will be apparent that a wireless network module for supporting data transmission and reception through the wireless network may additionally be provided within the device 100 for obtaining a 3D image and the display apparatus 200. In this regard, the light transmitting unit 10 and the light receiving unit 20 may be provided at one side outside the apparatus 100 for obtaining a 3D image, in an identifiable shape.

Figure 10:
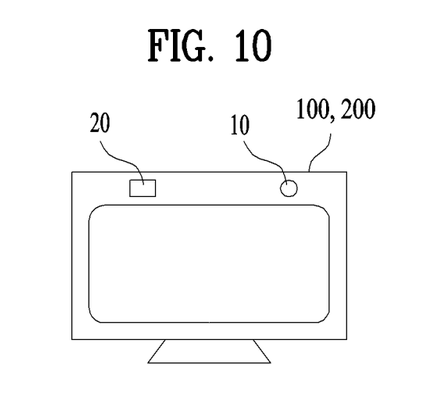
FIG. 10 is an exemplary diagram illustrating that an apparatus 100 for obtaining a 3D image and a display apparatus 200 are integrated with each other in accordance with the embodiment of the present invention.

Also, FIG. 10 is an exemplary diagram illustrating that an apparatus 100 for obtaining a 3D image and a display apparatus 200 are integrated with each other in accordance with the embodiment of the present invention. As shown in FIG. 10, if the two apparatuses 100 and 200 are an integrated single product, the light transmitting unit 10 and the light receiving unit 20 may be provided at one side outside the display apparatus 200 for obtaining a 3D image, in an identifiable shape.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

As described above, related matters have been described in the best mode for carrying out the invention.

As described above, the present invention may be applied to various fields that require 3D image acquisition. For example, the present invention may be applied to a 3D game player that recognizes an action signal through gesture recognition of a user or various remote controllers based on a user gesture.

The invention claimed is:

1. An apparatus for obtaining a 3D image, the apparatus comprising:
   a light transmitting unit configured to emit infrared ray (IR) structured light to a recognized object;
   a light receiving unit comprising an RGB-IR sensor configured to receive infrared rays and visible light reflected from the recognized object; and
   a processor configured to obtain 3D image information including depth information and a visible light image of the recognized object by using each of the infrared rays and the visible light, which are received by the light receiving unit,
   wherein the RGB-IR sensor includes a first pixel basic unit including one of each of R, G, B and IR pixels and a second pixel basic unit of which R, G, B and IR pixels are arranged in a different order from those of the first pixel basic unit, the RGB-IR sensor is comprised by alternately arranging the first pixel basic unit and the second pixel basic unit in a horizontal direction, and R, G, B and IR pixel arrangements in the first pixel basic unit and the second pixel basic unit are determined so that IR-pixels in the RGB-IR sensor are not arranged at equivalent intervals, and
   wherein the processor is further configured to:
   use IR pixels adjacent to a location where interpolation is to be performed, and
   give a high weighted value to the IR pixel adjacent to the location within a shortest distance to the location where interpolation is to be performed and a low weighted value to the IR pixel adjacent to the location within a longer distance to the location where interpolation is to be performed, in performing IR signal interpolation by using infrared rays received from the IR pixels.

2. The apparatus according to claim 1, further comprising:
   a 3D image recovery unit for recovering the 3D image of the recognized object by using 3D image information obtained from the processor; and
   a display unit for providing the received 3D image on a visual screen.

3. The apparatus according to claim 1, wherein the first pixel basic unit is arranged in the pixel order of R→G→B→IR clockwise from a left top, and the second pixel basic unit is arranged in the pixel order of IR→G→B→R clockwise from a left top.

4. The apparatus according to claim 1, wherein the first pixel basic unit is arranged in the pixel order of R→IR→B→G clockwise from a left top, and the second pixel basic unit is arranged in the pixel order of R→B→IR→G clockwise from a left top.

5. The apparatus according to claim 1, wherein the IR pixel adjacent to the location within the shortest distance is the IR pixel located at any one of left, right, up and down portions of the location where interpolation is to be performed.

6. The apparatus according to claim 1, wherein, if two neighboring IR pixels exist within the shortest distance, the processor gives the same weighted value to the corresponding neighboring IR pixels, in performing the IR signal interpolation.

7. The apparatus according to claim 1, wherein the processor uses IR pixels adjacent to the location where interpolation is to be performed and determines the number of IR pixels used for interpolation depending on the number of IR pixels within the shortest distance, which are adjacent to the location where interpolation is to be performed, in performing IR signal interpolation by using infrared rays received from the IR pixels.

8. The apparatus according to claim 7, wherein, if one IR pixel within the shortest distance, which is adjacent to the location where interpolation is to be performed, exists, the processor further uses two IR pixels located in a diagonal direction as well as the IR pixel within the shortest distance, in performing the IR signal interpolation.

9. The apparatus according to claim 8, wherein the processor gives a higher weighted value to the IR pixel within the shortest distance than the two IR pixels located in the diagonal direction, in performing the IR signal interpolation.

10. The apparatus according to claim 7, wherein, if two IR pixels, which are adjacent to the location where interpolation is to be performed, exist within the shortest distance, the processor uses the two IR pixels only for the IR signal interpolation, in performing the IR signal interpolation.

11. The apparatus according to claim 10, wherein the processor gives the same weighted value to the two IR pixels in performing the IR signal interpolation.

12. An apparatus for obtaining a 3D image, the apparatus comprising:
   a light transmitting unit configured to emit infrared ray (IR) structured light to a recognized object;

a light receiving unit comprising an RGB-IR sensor configured to receive infrared rays and visible light reflected from the recognized object; and a processor configured to:

obtain 3D image information including depth information and a visible light image of the recognized object by using each of the infrared rays and the visible light, which are received by the light receiving unit, the RGB-IR sensor including a first pixel basic unit including one of each of R, G, B and IR pixels and a second pixel basic unit of which R, G, B and IR pixels are arranged in a different order from those of the first pixel basic unit, the RGB-IR sensor being comprised by alternately arranging the first pixel basic unit and the second pixel basic unit in a horizontal direction, and R, G, B and IR pixel arrangements in the first pixel basic unit and the second pixel basic unit are determined so that IR-pixels in the RGB-IR sensor are not arranged at equivalent intervals, use IR pixels adjacent to a location where interpolation is to be performed, the IR pixels including a first IR pixel bordering an edge of the location where interpolation is to be performed and at least one second IR pixel diagonal to the location where interpolation is to be performed to contact a corner of the location where interpolation is to be performed, and give a first weighted value to the first IR pixel and a second weighted value to the at least one IR pixel to perform IR signal interpolation by using infrared rays received from the IR pixels, the first weighted value being greater than the second weighted value.

13. The apparatus according to claim 12, wherein the at least one second pixel is two pixels.

* * * * *